United States Patent
Crawford

(10) Patent No.: US 7,980,396 B2
(45) Date of Patent: Jul. 19, 2011

(54) TRUSS TYPE HIGH PRESSURE CENTER SUPPORT FOR LIQUID FILTRATION

(75) Inventor: Brian Scott Crawford, Bessemer City, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 395 days.

(21) Appl. No.: 12/165,910

(22) Filed: Jul. 1, 2008

(65) Prior Publication Data
US 2010/0000922 A1    Jan. 7, 2010

(51) Int. Cl.
*B01D 27/00* (2006.01)

(52) U.S. Cl. .............. 210/457; 210/437; 210/493.1; 210/440; 210/167.02

(58) Field of Classification Search .......... 210/457
See application file for complete search history.

(56) References Cited

U.S. PATENT DOCUMENTS

| | | | |
|---|---|---|---|
| 4,324,571 A * | 4/1982 | Johnson, Jr. | 55/302 |
| 5,736,045 A | 4/1998 | Bies et al. | |
| 6,401,938 B1 | 6/2002 | Schewitz | |
| 6,962,256 B2 * | 11/2005 | Nguyen et al. | 210/440 |
| 2009/0057221 A1 | 3/2009 | Bridges | |

FOREIGN PATENT DOCUMENTS

| | | |
|---|---|---|
| DE | 44 09 970 A1 | 9/1995 |
| DE | 196 23 326 A1 | 12/1997 |
| WO | 2006/112853 A1 | 10/2006 |

OTHER PUBLICATIONS

European search report dated Dec. 18, 2009.

* cited by examiner

*Primary Examiner* — Walter D Griffin
*Assistant Examiner* — Denise R Anderson
(74) *Attorney, Agent, or Firm* — Crowell & Moring LLP

(57) ABSTRACT

A central support for a liquid filter is described. The support has a truss element disposable centrally in the liquid filter to provide a crush-resistant structure supporting a filter media of the liquid filter, elongated straight members of the truss element, connected at joints to form a coplanar cross section, and longitudinal members of the truss element, connecting the coplanar cross section and additional coplanar cross sections in a column-like configuration. The contact surfaces of the truss element for interfacing with the filter media are adapted to spread forces on the filter media over a desired surface area.

16 Claims, 6 Drawing Sheets

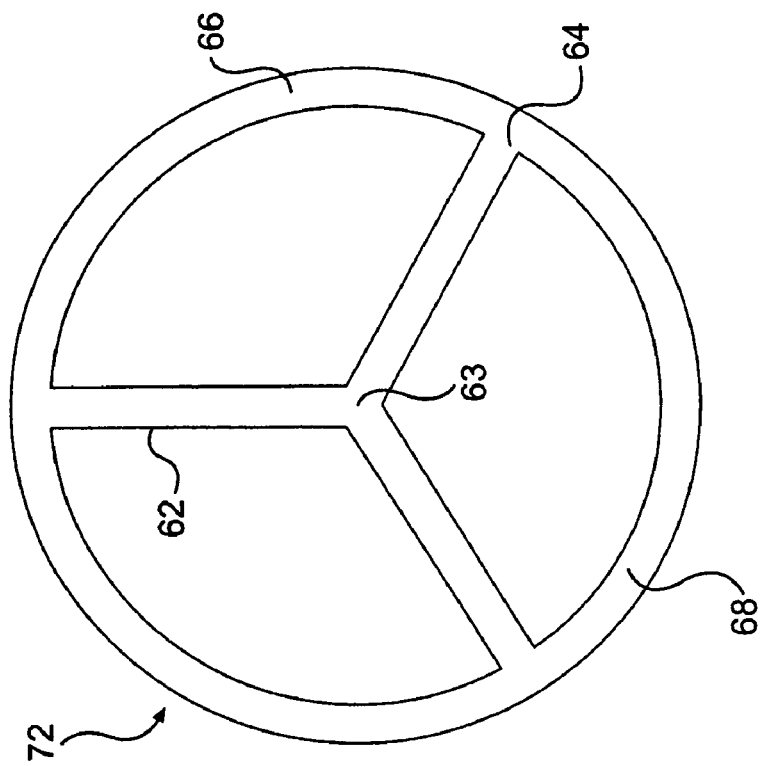
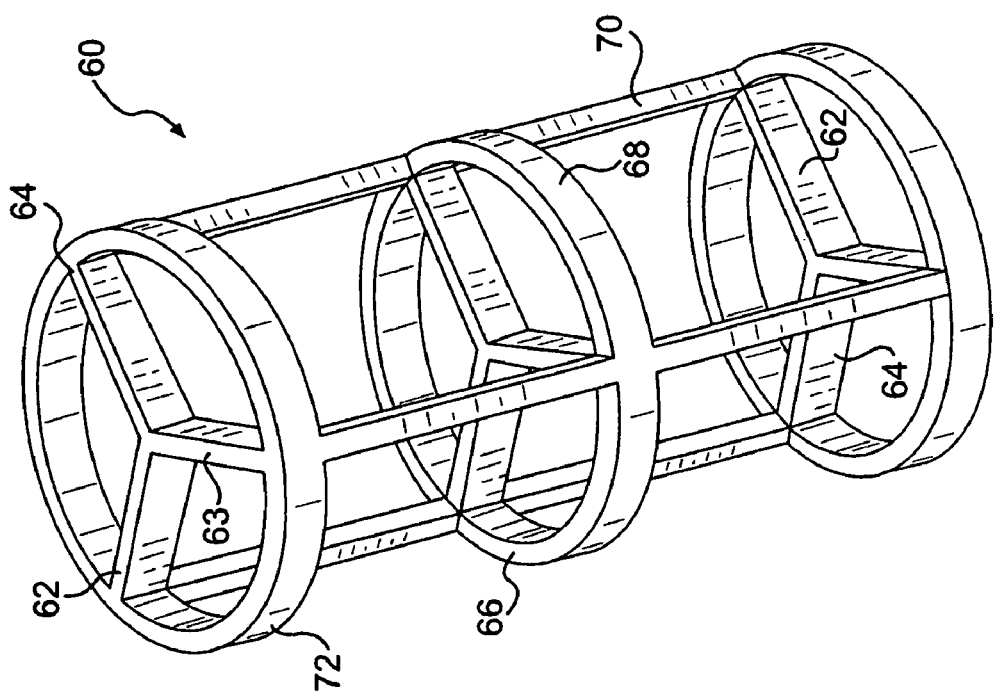

TRUSS TYPE HIGH PRESSURE CENTER SUPPORT FOR LIQUID FILTRATION

BACKGROUND AND SUMMARY OF THE INVENTION

This present invention relates to a filter for use in fluid systems, and more particularly, the invention relates to a center support element for a filter.

Filters are typically constructed from a housing formed of one or more components secured to one another. A filter media, which is typically a pleated type filter media, is disposed within the interior cavity of the housing. The filter media is generally cylindrical in shape with an exterior surface defining an input side through which dirty fluid enters. The interior of the filter media defines a central fluid passage acting as an outlet side that receives the cleaned fluid.

Conventional filters include a center tube acting as a filter media support element, which confers to the assembly a certain amount of structural strength. The more common tubes which are used to form the central support are generally made of metal, and can be formed as spirals, as a corrugated shell which is closed with a lock seam, or as a robust cylinder which is welded. These various configurations can rust during storage or prolonged periods of non-use, and can be difficult to manufacture. The metallic centers cause a long term pollution problem, because they remain in the environment for a protracted time. Burrs can form during the machining, rolling and cutting processes to manufacture the filters, which can further increase the environmental hazard posed by the filters when they are discarded after use.

The present invention provides a center support for a liquid filtration element which is biodegradable, to reduce the environmental impact of the discarded filters. The center support may be made of plastic or other non ferrous materials, and for example may be incineratable to avoid the problem of storing the discarded filters in a landfill, or in other environmentally damaging manners.

According to the invention, the center support provides a high collapse strength without significantly increasing the assembled weight of the filter. In one exemplary embodiment, the center support has a truss design which provides a stronger and more robust support than is possible with other configurations. The inventive structure is disposed centrally, for example within the central opening of the filter media, and is shaped to permit the flow of fluid through the center fluid passage. The center tube assembly provides the desired structural integrity while permitting the cleaned fluid to flow through the center passage, to the filter outlet.

Fluid filters such as the oil filters in common use in the lubrication systems of engines are subject to a multitude of forces. During operation, the high pressure fluid enters the filter and passes through the filtration media, causing expansion forces to be applied to the can or housing of the filter as well as the filter media. Even greater forces are applied during mounting and removal of disposable filters. These filters use threaded or other fasteners to secure to a mounting plate of an engine, and considerable force may be applied to the filter using a variety of tools to fasten or to remove the filter from the mounting plate. These forces generally tend to crush the filter can or housing, so that the center support according to the invention is useful in preventing the collapse of the can or housing.

According to exemplary embodiments of the invention, the center support is formed of a non ferrous material which does not rust, and is easily disposed of after the filter is discarded. For example, a plastic material may be used. Disposal can be by incineration, or the bio-degradable material may be left in a landfill or other waste disposal location. To obtain the desired strength while minimizing the weight of the center support, and thus of the entire filter, a truss structure may be used.

Other objects, advantages and novel features of the present invention will become apparent from the following detailed description of the invention when considered in conjunction with the accompanying drawings.

BRIEF DESCRIPTION OF THE DRAWINGS

FIG. 7 is a perspective view of the center element according to the second embodiment of the invention; and FIG. 8 is a cross sectional view of the center element shown in FIG. 7.

DETAILED DESCRIPTION OF THE DRAWINGS

The exemplary embodiments of a liquid filtration element according to the present invention incorporate a high pressure center support that confers structural strength to the can or shell of the filter, without adding excessive weight to the assembly. Also, the liquid filtration element according to the invention is made more environmentally friendly, by incorporating materials that are bio-degradable and/or incinerable. Because non ferrous materials are used for the center support, disposal of used filters is simplified, and corrosion of internal components is minimized.

According to the invention, the high pressure center support is formed using a truss structure. Trusses are well known structural members, and typically consist of geometric units formed by straight elongated members whose ends are connected at joints. The straight members are typically in a configuration where they are subjected only to longitudinal compression and/or tension forces. One type of truss utilizes triangular elements formed by three coplanar bars or rods connected by joints. Multiple ones of these planar elements can be connected, for example, by longitudinal elements, which may be disposed parallel to one another, to form a column-like structural support. The longitudinal elements also may be subjected only to compression and/or tension forces. In the exemplary embodiments shown, the multiple planar elements are generally parallel to one another. However, in other configurations, the planar elements can be angled relative to one another.

In the exemplary embodiments of the invention, the column like structural support is placed in the center fluid passage of the filter, defined by the filtration media. Because the center support is not solid, but rather is formed by multiple linear elements joined together, the oil or other liquid to be filtered can easily flow out of the filtration media and through the center fluid passage, to reach the outlet of the filter.

Figure 1:
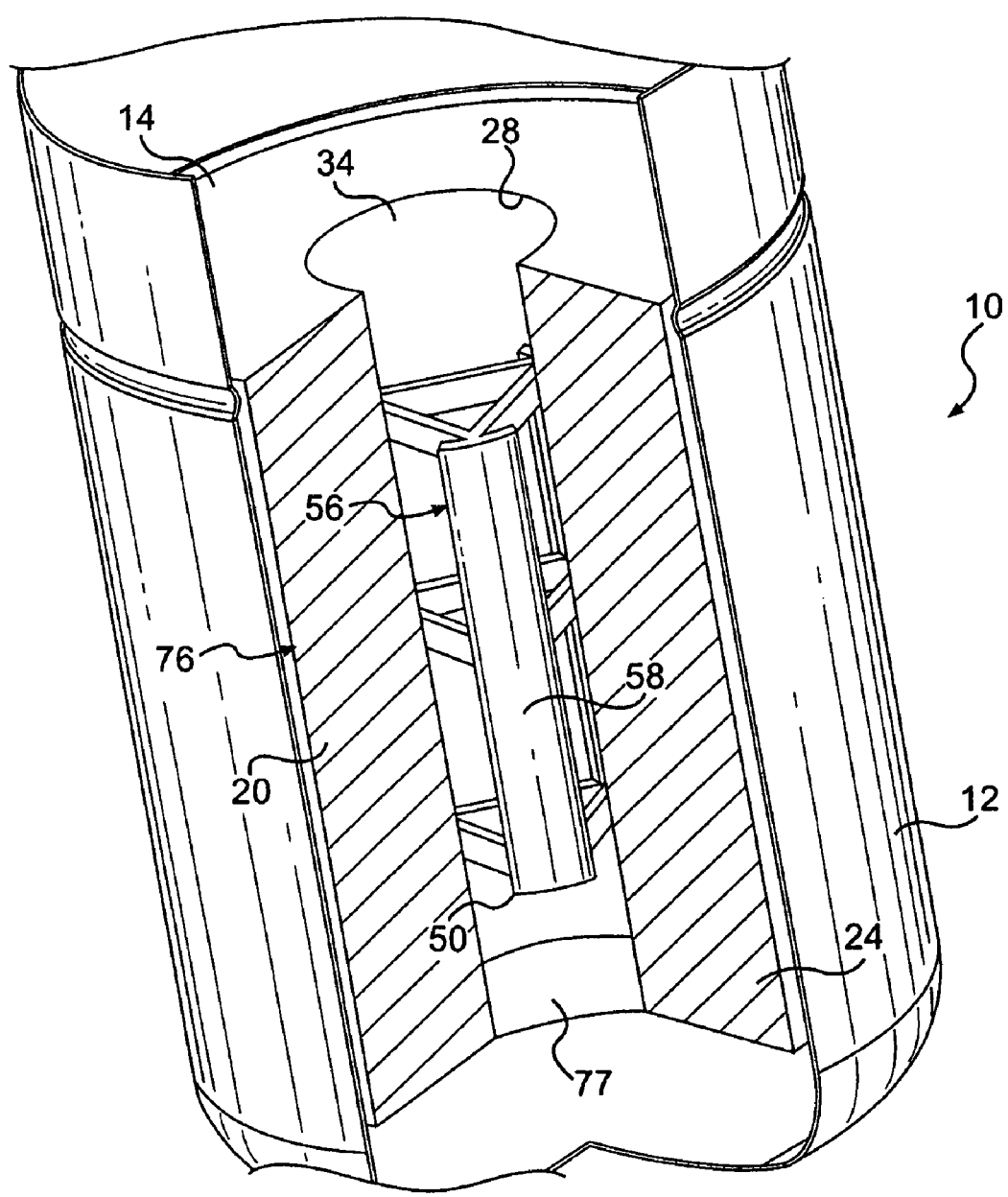
FIG. 1 is a cut away diagram showing a center support within a fluid filter, according to a first embodiment of the present invention.
Figure 2:
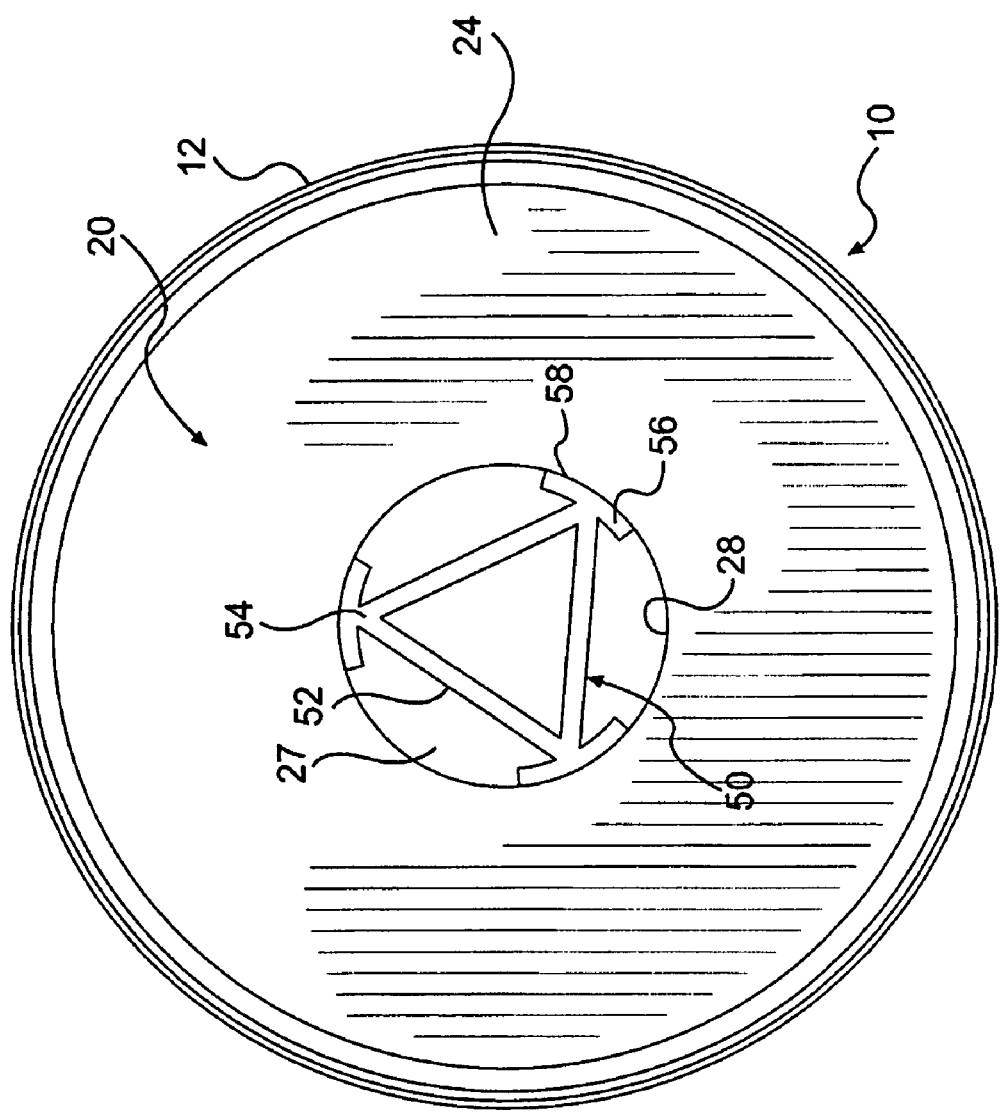
FIG. 2 is a cross sectional view of the center support in the filter element shown in FIG. 1.

FIGS. 1 and 2 show a first exemplary embodiment of a liquid filter 10 according to the invention. The filter 10 may be used, for example, in the lubrication system of an internal combustion engine, turbine, or other device requiring internal lubrication. The exemplary filter 10 includes a can or housing 12 that may be formed of one piece or of one or more components secured to one another. For example, a mounting surface 14 may be secured to the outer wall surface of the can 12 using known techniques.

The can 12 defines an interior cavity 20, with a filter media 24 being disposed therein. The filter media 24 may be, for example, a pleated material formed in a generally cylindrical shape, defining a central opening 27 through which flows the lubricating liquid. The exemplary filter media 24 has an inlet side 26 for receiving the dirty liquid, which is filtered, and which then exits the filter media 24 through an outlet side 28, so that it flows though the central opening 27 and exits the filter through the outlet opening 34. Opening 34 may be formed in the mounting surface 14, which for example may be a nut plate with a threaded fitting to permit the filter 10 to be fastened to a corresponding engine mounting plate and threaded stud (not shown).

Those of skill in the art will understand that the fluid flow direction through the filter may be reversed from the example described above. In addition, the center support according to embodiments of the invention may also be used with different types of filters, in addition to the removable filter described above. For example, the filter 10 may be a cartridge filter, having the outer surfaces of the filter media exposed. The filter may include disposable filter media which is removed for replacement from a reusable can or housing.

According to an exemplary embodiment of the invention, a center support 50 is disposed centrally in the filter, for example within the central opening 27, to provide additional structural integrity and crush-resistance to the filter 10. The center support 50 may be disposed adjacent to or proximal to the inner surfaces of the filter media 24, so as to assist in maintaining the cylindrical shape of the filter material and to prevent collapse of the central opening 27.

The center support 50 is constructed with a truss structure, which does not contact the filter media 24 along the entire extent of the inner surface, and does not impede flow from the outlet side 28, as can be better seen in FIG. 2. Accordingly, the liquid is not blocked from flowing out of the filter media 24 and into the central passage 27.

Because the center support 50 is formed of straight elongated members 52, connected at joints 54, the cross section of the central opening 27 is in large part available for the unimpeded longitudinal flow of the lubricating liquid towards the outlet aperture 34. The dimensions and shapes of the elements forming the truss may be selected to minimize the blockage of the central opening 27, and to avoid impeding the flow of liquid though the filter.

Figure 3:
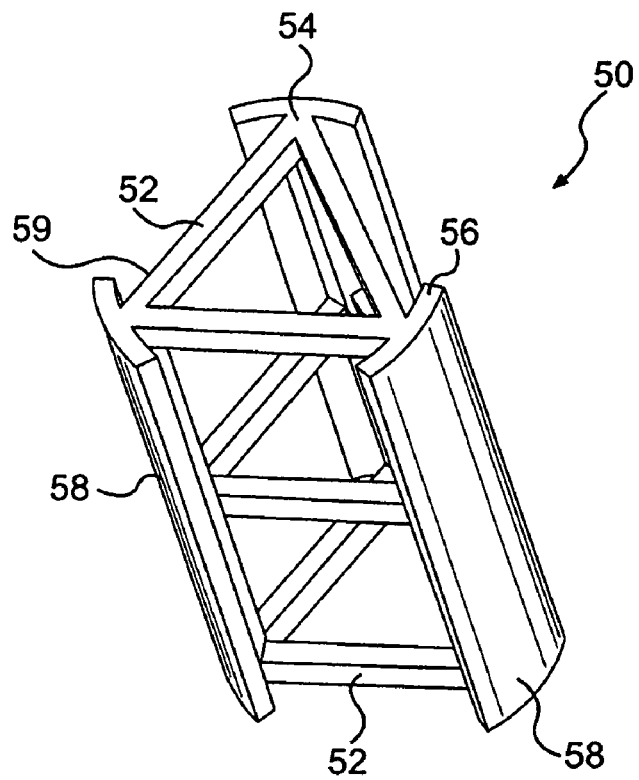
FIG. 3 is a perspective view of the center element according to the first embodiment of the present invention.
Figure 4:
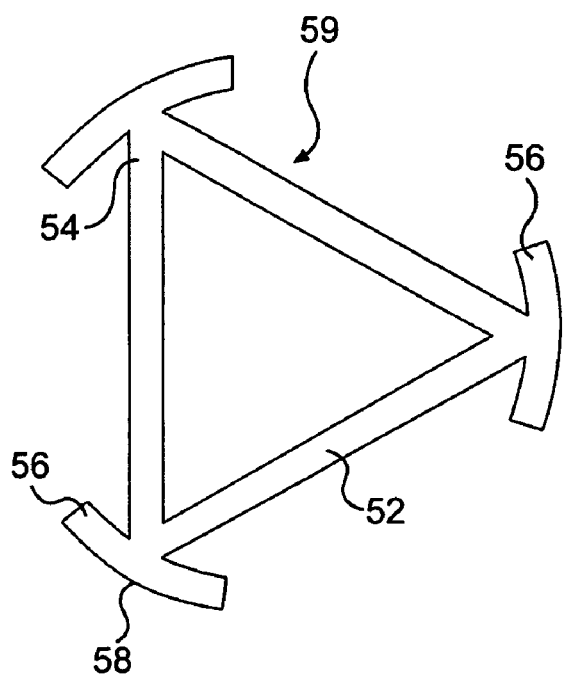
FIG. 4 is a cross sectional view of the center element shown in FIG. 3.

The configuration of the center support 50 is shown more clearly in FIGS. 3 and 4. The exemplary truss structure includes the elongated straight members 52, three of which are connected at joints 54 to form a triangular cross section 59. For example, the members 52 in each cross section 59 are coplanar. Several of the triangular cross sections 59 are joined by longitudinal members 56, to form the column-like truss of center support 50. The longitudinal members 56 may be in contact with the inner surface of the filter media 24, and may have a contact surface 58 adapted to spread the force applied to the filter media 24 over a larger surface. For example, the contact surface 58 may extend in the circumferential direction, along the inner surface of the filter media 24.

Those of skill in the art will understand that the number and distance between cross sections 59 may be varied to obtain a desired structural support of the filter media 24. Similarly, the size, number and disposition of the elongated straight elements 52 may be selected to provide the central support 50 with desired structural properties. A further consideration in selecting the size and disposition of the elements forming central support 50, is to minimize the blockage of liquid following through the filter.

Figure 5:
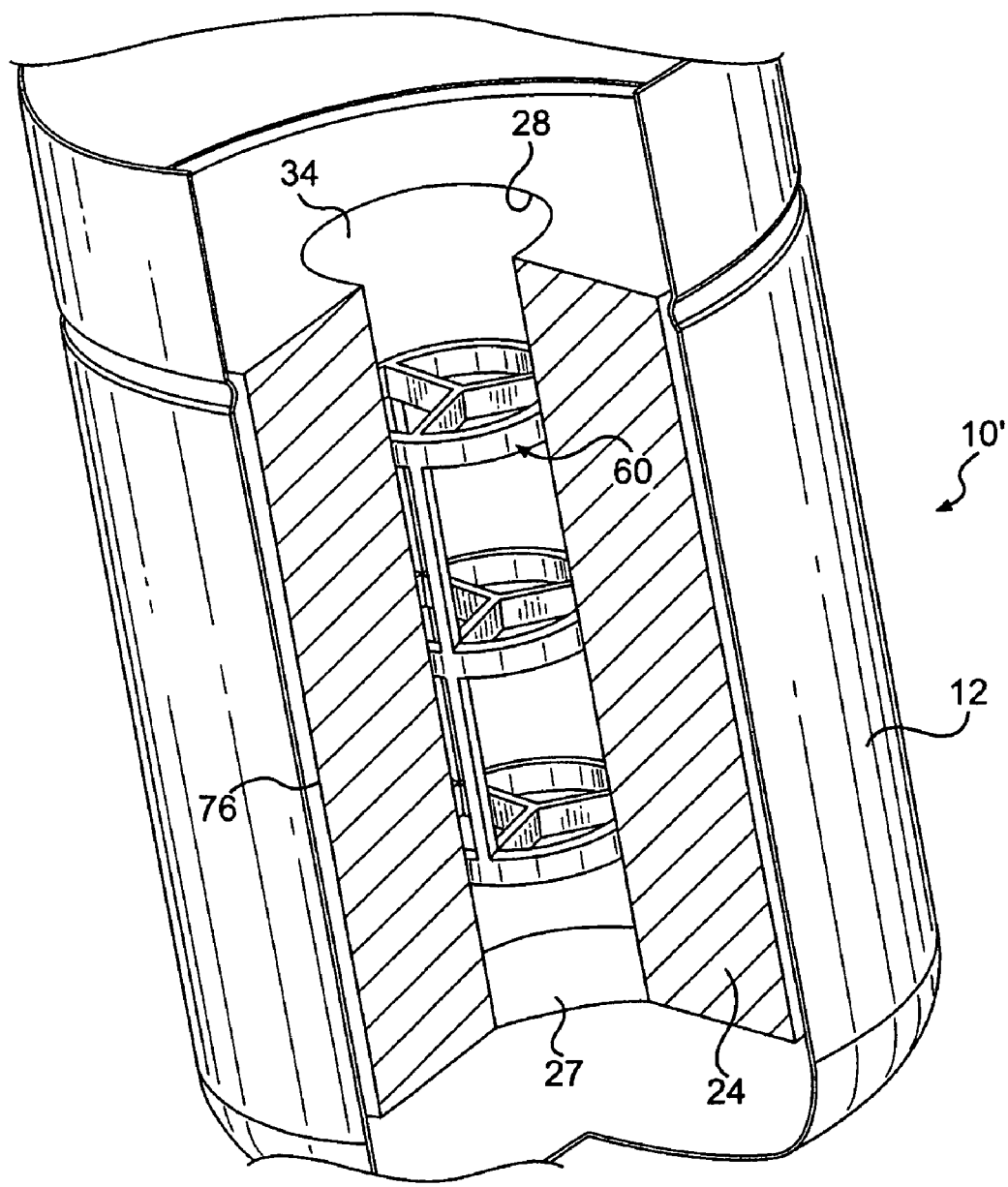
FIG. 5 is a cut away diagram showing a center support within a fluid filter, according to a second embodiment of the present invention.
Figure 6:
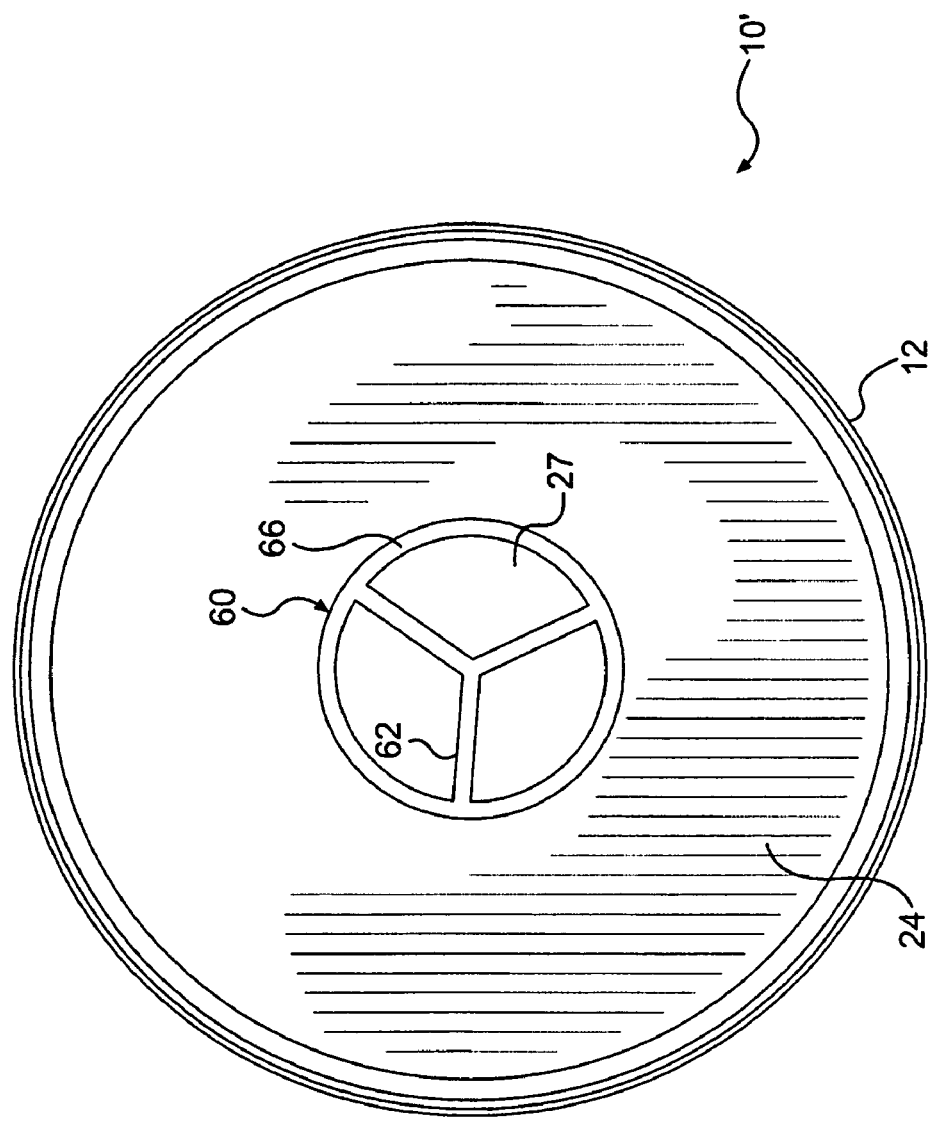
FIG. 6 is a cross sectional view of the center support in the filter element shown in FIG. 5.

Another embodiment of a liquid filter with a center support is shown in FIGS. 5 and 6. The filter 10' includes a can or housing 12 forming a cavity in which is disposed the filter media 24. The center support 60 is disposed within the central opening 27 defined by the filter media 24, so that it can provide structural support and maintain the shape of the filter media 24, and thus of the central opening 27. As in the embodiments described above, the exemplary filter 10' may be a spin-on filter which utilizes a threaded opening for fastening to an engine mounting plate, a filter capsule in which the filter media is inserted, or any other type of filter for a liquid.

As better shown in FIGS. 7 and 8, the center support 60 is formed of elongated straight members 62 connected at a central joint 63, which in this example is at the longitudinal center of the element. A circumferential element 66 is connected to the straight members 62 at joints 64, and provides additional structural strength as well as an interface between the center support 60 and the filter media 24. To better distribute the forces applied to the filter media 24, the contact surfaces 68 may be designed with a surface area selected to prevent damage to the filter material due to excessive pressured. For example, the contact surfaces 68 may extend longitudinally.

The exemplary combination of the elongated straight members 62 and the circumferential member 66 forms a coplanar cross section 72 of a generally trilateral shape. Multiple cross sections 72 can be stacked to form the truss of the central support 60. For example, longitudinal elements 70 may be used to connect multiple cross sections 72, to form a truss that is insertable along the longitudinal axis of the central opening 27 of the filter media 24.

The central support 60 provides sufficient contact with the inner surfaces of the filter media 24 to maintain its shape during normal operations, while leaving a sufficient amount of that surface area unblocked, so that the liquid is free to flow into the central opening 27 with minimal restriction. The open spaces left between the elements 62, 66 of the truss also permit passage of the liquid through the filter in the longitudinal direction with little restriction.

Those of skill in the art will understand that modifications to the above described trusses for the central supports 50 and 60 can be carried out without departing from the scope of the invention. For example, the relative length, thickness and spacing of the various truss elements may be varied, to achieve a desired structural strength, while avoiding blocking the flow of liquid. Other geometric shapes of the cross sections may be used, for example quadrilateral with sets of four elongated straight elements, non-circular, and other configurations suitable to match the shape of the filter element, and to help retain the shape of the filter media. The separation distance between the various cross sections 72 may also be selected to provide the desired structural support to the filter media 24. More or fewer than the three exemplary cross sections 72 shown in the drawings may thus be employed.

As indicated above, the truss structure of the central supports according to the invention may be formed of a non ferrous material. For example, polymeric or other materials which can be incinerated and/or which are bio-degradable may be used The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A central support for a liquid filter, comprising:
    a truss element disposable centrally in the liquid filter to provide a crush-resistant structure supporting a filter media of the liquid filter;
    elongated straight members of the truss element, connected at joints to form a coplanar cross section, wherein the coplanar cross section is a polygon;
    longitudinal members of the truss element, connecting the coplanar cross section and additional coplanar cross sections in a column-like configuration; and
    contact surfaces of the truss element for interfacing with the filter media, adapted to spread forces on the filter media over a desired surface area.

2. The central support as recited in claim 1, further comprising circumferential extensions of the contact surfaces abutting surfaces of the filter media, having a length selected to obtain the desired surface area.

3. The central support as recited in claim 1, wherein the cross section is a coplanar triangular cross section.

4. The central support as recited in claim 3, wherein the triangular cross section comprises three elongated straight members connected in pairs at three joints.

5. The central support as recited in claim 1, wherein the coplanar cross section and the additional coplanar cross sections are substantially parallel.

6. The central support as recited in claim 1, wherein the truss element is disposable in a central opening defined by the filter media.

7. The central support as recited in claim 1, wherein dimensions of the elongated straight members forming the coplanar cross section are selected to minimize blockage of liquid flowing through the liquid filter.

8. The central support as recited in claim 1, wherein dimensions of the longitudinal members and of the contact surfaces are selected to minimize blockage of liquid flowing from the filter media.

9. The central support as recited in claim 1, wherein the truss element is formed of one of an incineratable and a biodegradable material.

10. A filter for a lubrication system, comprising:
    a can defining an outer housing;
    a filter media disposed within the can;
    a central support to provide a crush-resistant structure supporting the filter media of the filter:
    a truss element of the central support disposable centrally in the filter;
    elongated straight members of the truss element, connected at joints to form a coplanar cross section, wherein the coplanar cross section is a polygon;
    longitudinal members of the truss element, connecting the coplanar cross section and additional coplanar cross sections in a column-like configuration; and
    contact surfaces of the truss element for interfacing with the filter media, adapted to spread forces on the filter media over a desired surface area.

11. The filter as claimed in claim 10, wherein the central support is formed of one of an incineratable and a biodegradable material.

12. The filter as claimed in claim 10, wherein the coplanar cross section is a triangular cross section and at least one of said additional coplanar cross sections is a trilateral cross section.

13. The filter as claimed in claim 10, further comprising a peripheral element of the coplanar cross section defining one of the contact surfaces.

14. The filter as claimed in claim 13, wherein the peripheral element is circular.

15. The filter as claimed in claim 10, further comprising extensions of the longitudinal members defining the contact surfaces.

16. The central support as recited in claim 1, wherein the joints of the elongated straight members abut the longitudinal members of the truss element.

* * * * *